(12) United States Patent
Ayoub et al.

(10) Patent No.: US 9,331,936 B2
(45) Date of Patent: May 3, 2016

(54) SWITCH FABRIC SUPPORT FOR OVERLAY NETWORK FEATURES

(71) Applicant: MELLANOX TECHNOLOGIES LTD., Yokneam (IL)

(72) Inventors: Ali Ayoub, Santa Clara, CA (US); Diego Crupnicoff, Buenos Aires (AR); Dror Goldenberg, Zichron Yaakov (IL); Michael Kagan, Zichron Yaakov (IL); Oded Wertheim, Zichron Yaakov (IL); Yaron Haviv, Tel Mond (IL)

(73) Assignee: MELLANOX TECHNOLOGIES LTD., Yokneam (IL)

( * ) Notice: Subject to any disclaimer, the term of this patent is extended or adjusted under 35 U.S.C. 154(b) by 548 days.

(21) Appl. No.: 13/731,030

(22) Filed: Dec. 30, 2012

(65) Prior Publication Data

US 2014/0185615 A1 Jul. 3, 2014

(51) Int. Cl.
*H04L 12/28* (2006.01)
*H04L 12/715* (2013.01)
(Continued)

(52) U.S. Cl.
CPC .............. *H04L 45/64* (2013.01); *H04L 49/358* (2013.01); *H04L 49/70* (2013.01); *H04L 12/465* (2013.01); *H04L 12/467* (2013.01); *H04L 12/4641* (2013.01); *H04L 12/4645* (2013.01); *H04L 12/4654* (2013.01); *H04L 12/4658* (2013.01); *H04L 12/4662* (2013.01); *H04L 12/4666* (2013.01); *H04L 12/4675* (2013.01); *H04L 12/4679* (2013.01); *H04L 45/52* (2013.01); *H04L 45/74* (2013.01); *H04L 45/741* (2013.01);

(Continued)

(58) Field of Classification Search
CPC ............ H04L 12/4641; H04L 12/4645; H04L 12/465; H04L 12/4654; H04L 12/4658; H04L 12/4662; H04L 12/4666; H04L 12/467; H04L 12/4675; H04L 12/4679; H04L 45/52; H04L 45/74; H04L 45/741; H04L 45/64; H04L 49/208; H04L 49/354; H04L 49/70; H04L 49/358; H04L 61/10; H04L 61/103; H04L 61/106; H04L 61/2038; H04L 61/25; H04L 61/2596
USPC .......................... 370/389, 392, 393, 401, 409
See application file for complete search history.

(56) References Cited

U.S. PATENT DOCUMENTS 7,051,365 B1 5/2006 Bellovin
7,773,538 B2 8/2010 Wang et al.
(Continued)

OTHER PUBLICATIONS

"Generic Routing Encapsulation (GRE)", S. Hanks, et al., Request for Comments: 1701, Oct. 1994.*
(Continued)

*Primary Examiner* — Peter Cheng
(74) *Attorney, Agent, or Firm* — D. Kliger IP Services Ltd.

(57) ABSTRACT

A method for communication in a packet data network including a subnet containing multiple nodes having respective ports. The method includes assigning respective local identifiers to the ports in the subnet, such that each port receives a respective local identifier that is unique within the subnet to serve as an address for traffic within the subnet that is directed to the port. In addition to the local identifiers, respective port identifiers are assigned to the ports, such that at least one of the port identifiers is shared by a plurality of the ports, but not by all the ports, in the subnet. The plurality of the ports are addressed collectively using the at least one of the port identifiers.

14 Claims, 5 Drawing Sheets

(51) Int. Cl.
*H04L 12/46* (2006.01)
*H04L 12/781* (2013.01)
*H04L 12/741* (2013.01)
*H04L 12/56* (2006.01)
*H04L 29/12* (2006.01)
*H04L 12/931* (2013.01)

(52) U.S. Cl.
CPC .............. *H04L49/208* (2013.01); *H04L 49/354* (2013.01); *H04L 61/10* (2013.01); *H04L 61/103* (2013.01); *H04L 61/106* (2013.01); *H04L 61/2038* (2013.01); *H04L 61/25* (2013.01); *H04L 61/2596* (2013.01)

(56) References Cited

U.S. PATENT DOCUMENTS

| | | | |
|---|---|---|---|
| 8,201,168 | B2 | 6/2012 | Haviv et al. |
| 8,570,856 | B2* | 10/2013 | Southworth et al. .......... 370/217 |
| 2004/0213220 | A1 | 10/2004 | Davis |
| 2005/0144313 | A1* | 6/2005 | Arndt et al. ................... 709/238 |
| 2005/0266842 | A1 | 12/2005 | Nasielski et al. |
| 2007/0248085 | A1 | 10/2007 | Volpano |
| 2009/0034540 | A1 | 2/2009 | Law |
| 2010/0061385 | A1* | 3/2010 | Welin et al. ................... 370/401 |
| 2011/0007741 | A1* | 1/2011 | Kreeger et al. ............... 370/389 |
| 2011/0261687 | A1 | 10/2011 | Armstrong et al. |
| 2012/0093023 | A1 | 4/2012 | Ficet et al. |
| 2012/0287932 | A1 | 11/2012 | Haddad et al. |
| 2013/0124750 | A1 | 5/2013 | Anumala et al. |
| 2013/0301646 | A1 | 11/2013 | Bogdanski et al. |

OTHER PUBLICATIONS

U.S. Appl. No. 13/731,130 Office Action dated Nov. 5, 2014.
U.S. Appl. No. 13/721,052 Office Action dated Feb. 26, 2015.
Sridharan et al., "NVGRE: Network Virtualization using Generic Routing Encapsulation", Network Working Group, Internet Engineering Task Force (IETF), 16 pages, Jul. 9, 2012.
Mahalingam et al, "VXLAN: A Framework for Overlaying Virtualized Layer 2 Networks over Layer 3 Networks", Network Working Group, Internet Engineering Task Force (IETF), 18 pages, Aug. 22, 2012.
Chu et al., "Transmission of IP over InfiniBand (IPoIB)", Network Working Group, RFC 4391, 22 pages, Apr. 2006.
InfiniBand Trade Association, "InfiniBand™ Architecture Specification vol. 1", Release 1.2.1, Chapters 7 & 9, Nov. 2007.
Hanks et al., "Generic Routing Encapsulation (GRE)", RFC 1701, 8 pages, Oct. 1994.
Bitar et al., "NVO3 Data Plane Requirements", Network Working Group, Internet Engineering Task Force (IETF), Section 3, Dec. 13, 2012.
Gu et al., "The mechanism and signalling between TES and NVE", Network Working Group, Internet Engineering Task Force (IETF), section 5.1, Oct. 19, 2012.
Gu et al., "Analysis of external assistance to NVE and consideration of architecture", Network Working Group, Internet Engineering Task Force (IETF), section 4, Jul. 9, 2012.
Cisco Systems Inc., "Cisco Nexus 1000V Series Switches", Deployment Guide, version 3, 45 pages, Nov. 2012.
Cisco Systems Inc., "Cisco Nexus 1000V VXLAN Configuration Guide", Release 4.2(1)SV1(5.1), Apr. 18, 2012.
Kreeger et al., "Network Virtualization Overlay Control Protocol Requirements", Network Working Group, Internet Engineering Task Force (IETF), section 3, Oct. 22, 2012.
Lasserre et al., "Framework for DC Network Virtualization", Network Working Group, Internet Engineering Task Force (IETF), section 4.2, Jul. 9, 2012.
Noam et al., U.S. Appl. No. 13/731,130, filed Dec. 31, 2012.
U.S. Appl. No. 14/637,414, Office Action dated Feb. 12, 2016.

\* cited by examiner

SWITCH FABRIC SUPPORT FOR OVERLAY NETWORK FEATURES

FIELD OF THE INVENTION

The present invention relates generally to computer networks, and particularly to network virtualization.

BACKGROUND

Network virtualization involves creating virtual Layer-2 and/or Layer-3 topologies on top of an arbitrary physical (Layer-2 or Layer-3) network. Network Virtualization decouples virtual networks and addresses from physical network infrastructure, providing isolation and concurrency between multiple virtual networks on the same physical network infrastructure. Such virtualized networks can be used, for example, in data centers and cloud computing services. Virtualized networks of this sort are commonly referred to as "overlay networks" or "tenant networks," and these latter terms are used interchangeably in the present patent application.

A number of protocols have been developed to support network virtualization. For example, Sridharan et al. describe the NVGRE virtualization protocol in an Internet Draft entitled "NVGRE: Network Virtualization using Generic Routing Encapsulation," draft-sridharan-virtualization-nvgre-01 (Jul. 9, 2012), published by the Internet Engineering Task Force (IETF). Another network virtualization protocol is VXLAN (Virtual eXtensible Local Area Network), which is described by Mahalingam et al. in an Internet Draft entitled "VXLAN: A Framework for Overlaying Virtualized Layer 2 Networks over Layer 3 Networks," published by the IETF as draft-mahalingam-dutt-dcops-vxlan-02 (Aug. 22, 2012). These protocols are directed to virtualization and encapsulation of Layer 2 communications (such as Ethernet™ links) over Internet Protocol (IP) networks.

Attempts have also been made to provide a framework for encapsulation and transmission of various protocols over InfiniBand™ (IB) networks. For example, Chu and Kashyap describe a method for encapsulating and transmitting IP and Address Resolution Protocol (ARP) packets over IB in "Transmission of IP over InfiniBand (IPoIB)," published in 2006 as IETF Request for Comments (RFC) 4391. This document specifies the link-layer address to be used when resolving IP addresses in IB subnets and the setup and configuration of IPoIB links.

U.S. Pat. No. 8,201,168 describes the use of virtual input-output connections for machine virtualization. A virtual computer system includes at least one virtual or physical compute node, which produces data packets having respective source attributes. At least one Virtual Input-Output Connection (VIOC) is uniquely associated with the values of the source attributes. The virtual computer system is implemented on a physical computer system, which includes at least one physical packet switching element. The physical packet switching element is configured to identify the data packets whose source attributes have the values that are associated with the VIOC and to perform operations on the identified data packets so as to enforce a policy with regard to the VIOC.

SUMMARY

Embodiments of the present invention provide improved methods and apparatus for network communications, which can be useful particularly in the context of network virtualization.

There is therefore provided, in accordance with an embodiment of the present invention, a method for communication in a packet data network including a subnet containing multiple nodes having respective ports. The method includes assigning respective local identifiers to the ports in the subnet, such that each port receives a respective local identifier that is unique within the subnet to serve as an address for traffic within the subnet that is directed to the port. In addition to the local identifiers, respective port identifiers are assigned to the ports, such that at least one of the port identifiers is shared by a plurality of the ports, but not by all the ports, in the subnet. The plurality of the ports are addressed collectively using the at least one of the port identifiers.

In a disclosed embodiment, addressing the plurality of the ports includes aggregating multiple data links in the subnet that are respectively connected to the ports in the plurality in order to provide an aggregated data channel.

In some embodiments, the subnet operates in accordance with a first network protocol and supports an overlay network operating in accordance with a second network protocol, and wherein addressing the plurality of the ports includes transmitting over the subnet a data packet that has an outer header in accordance with the first network protocol and encapsulates a data frame having an inner header in accordance with the second network protocol. Typically, transmitting the data packet includes specifying the local identifier of a destination port of the data packet in the outer header, specifying a port identifier of the destination port in an encapsulation header in the data packet, and specifying an overlay network address of a destination endpoint of the overly network in the inner header.

There is also provided, in accordance with an embodiment of the present invention, a method for communication, which includes aggregating multiple data links between multiple first ports of a first node and multiple second ports of a second node in a network in order to provide an aggregated data channel. Upon receiving an address resolution request relating to a data path traversing the aggregated data channel, a response is returned to the request that identifies the first ports and indicates a status of each of one or more of the first ports.

Typically, the method includes transmitting data packets over the data path while directing the transmitted data packets to respective ports among the multiple first ports responsively to the status.

There is additionally provided, in accordance with an embodiment of the present invention, a method for communication, which includes transmitting first data packets in an underlying network in accordance with a first packet communication protocol, which defines a first header format for an outer header of the first data packets, wherein the outer header includes data link, network, and transport-layer headers, and is followed by a data payload. Second data packets in accordance with one or more second packet communication protocols are encapsulated in the data payload of at least some of the first data packets, wherein the second data packets define respective second header formats of inner packet headers that are contained in the data payload of the at least some of the first data packets. An intermediate header is inserted in the at least some of the first data packets between the outer and inner packet headers, wherein the intermediate header specifies a second communication protocol of the inner header and has a format that is uniform over all of the second packet communication protocols supported by the underlying network.

There is further provided, in accordance with an embodiment of the present invention, communication apparatus, including a node configured for deployment in a subnet containing multiple nodes of a packet data network, the node including multiple ports for connection to the network and being configured to receive a first assignment of respective local identifiers to the ports, such that each port receives a respective local identifier that is unique within the subnet to serve as an address for traffic within the subnet that is directed to the port, wherein the node is configured to receive, in addition to the local identifiers, a second assignment of respective port identifiers to the ports, such that at least one of the port identifiers is shared by a plurality of the ports of the node, but not by all the ports, in the subnet, and the plurality of the ports are addressed collectively using the at least one of the port identifiers, and wherein the node is configured to transmit and receive data packets using both the local identifiers and the port identifiers.

The node may include a host computer, which includes a network interface controller including the multiple ports, or the node may include a switch.

There is moreover provided, in accordance with an embodiment of the present invention, apparatus for communication, including first and second nodes configured for deployment in a packet data network containing multiple nodes, the first node including multiple first ports for connection to respective data links in the network and being configured for aggregation of the data links between the multiple first ports and multiple second ports of the second node in order to provide an aggregated data channel, wherein at least the first nodes is configured to receive an address resolution request relating to a data path traversing the aggregated data channel and to return a response to the request that identifies the first ports and indicates a status of each of one or more of the first ports.

The present invention will be more fully understood from the following detailed description of the embodiments thereof, taken together with the drawings in which:

DETAILED DESCRIPTION OF EMBODIMENTS

Most recent work on network virtualization protocols has focused on the use of IP networks as the underlying infrastructure for overlay networks. These virtualization protocols build on the features of the IP infrastructure and protocol suite and are therefore incompatible with certain features of other infrastructures, such as InfiniBand (IB) networks. IB has advantages of high speed and low latency and is the infrastructure of choice in many data centers.

Embodiments of the present invention that are described hereinbelow therefore provide methods and apparatus that can be used effectively in network virtualization over IB, as well as other sorts of underlying networks. These methods are capable of supporting substantially any type of Layer-2 overlay network, such as virtualized Ethernet networks. In the disclosed embodiments, multiple virtual Ethernet networks may be overlaid on an IB subnet, as well as over multiple connected subnets, in an IB fabric. The network virtualization protocols described herein are capable of providing transparent support over the IB fabric for Ethernet features, such as medium access control (MAC) (Layer-2) forwarding and link aggregation (LAG). Although the embodiments that are described hereinbelow relate specifically, for the sake of clarity, to the use of IB as an underlying network, however, features of these embodiments may similarly be applied, mutatis mutandis, over underlying networks of other sorts, such as Ethernet, IP and Fibre Channel networks.

In link aggregation, multiple parallel connections between a pair of nodes are joined to serve as a single logical data channel, and traffic over this data channel is typically divided among the participating physical links and ports of the nodes. This sort of aggregation is supported in Ethernet networks by assigning the same MAC address to all of the participating ports on each of the nodes. In the IB protocol, however, each port in a subnet has its own, unique Layer-2 physical address, referred to as a local identifier (LID), which is assigned by the subnet manager. By the same token, for communications across multiple IB subnets, a unique Global Identifier (GID) of each port may be used for routing, along with the LID.

In some embodiments of the present invention, in order to support overlay network features such as LAG, respective port identifiers are assigned to the ports in addition to the local identifiers (and possibly global identifiers) assigned by the subnet manager in accordance with the IB protocol. A given port identifier can be shared by multiple ports (though of course, not by all the ports) in the subnet, and this shared port identifier can then be used in addressing the participating ports collectively. This sort of collective addressing enables link aggregation to be implemented in a manner that is transparent to the overlay network, i.e., without requiring any change in the overlay network protocols.

When multiple data links are aggregated in this fashion, particularly (although not exclusively) links in a virtualized network, it can be advantageous for an entity that is transmitting data over the aggregated data channel to receive information regarding the states of the individual links in the channel. In this manner, if one or more of the links are out of operation, the transmitting entity can adjust its data transmission accordingly. Ordinarily (in IP networks, for example), address resolution requests and responses are used only to identify the Layer-2 (MAC) address that correspond to a given Layer-3 (IP) address. By contrast, in some embodiments of the present invention, when a network node receives an address resolution request relating to a data path that traverses an aggregated data channel, the node returns a response that not only identifies the Layer-2 address of the ports involved, but also indicates the status of each of the ports. Port and link status are thus propagated efficiently through the network.

Other embodiments provide an intermediate header that can be used in encapsulating packets for transmission through an overlay network, between the outer header belonging to the underlying network and the inner header belonging to the overlay network. The intermediate header has a format that is uniform, regardless of the type and protocol of the overlay network. It thus facilitates efficient hardware parsing and support for overlay networks of different types.

Figure 1:
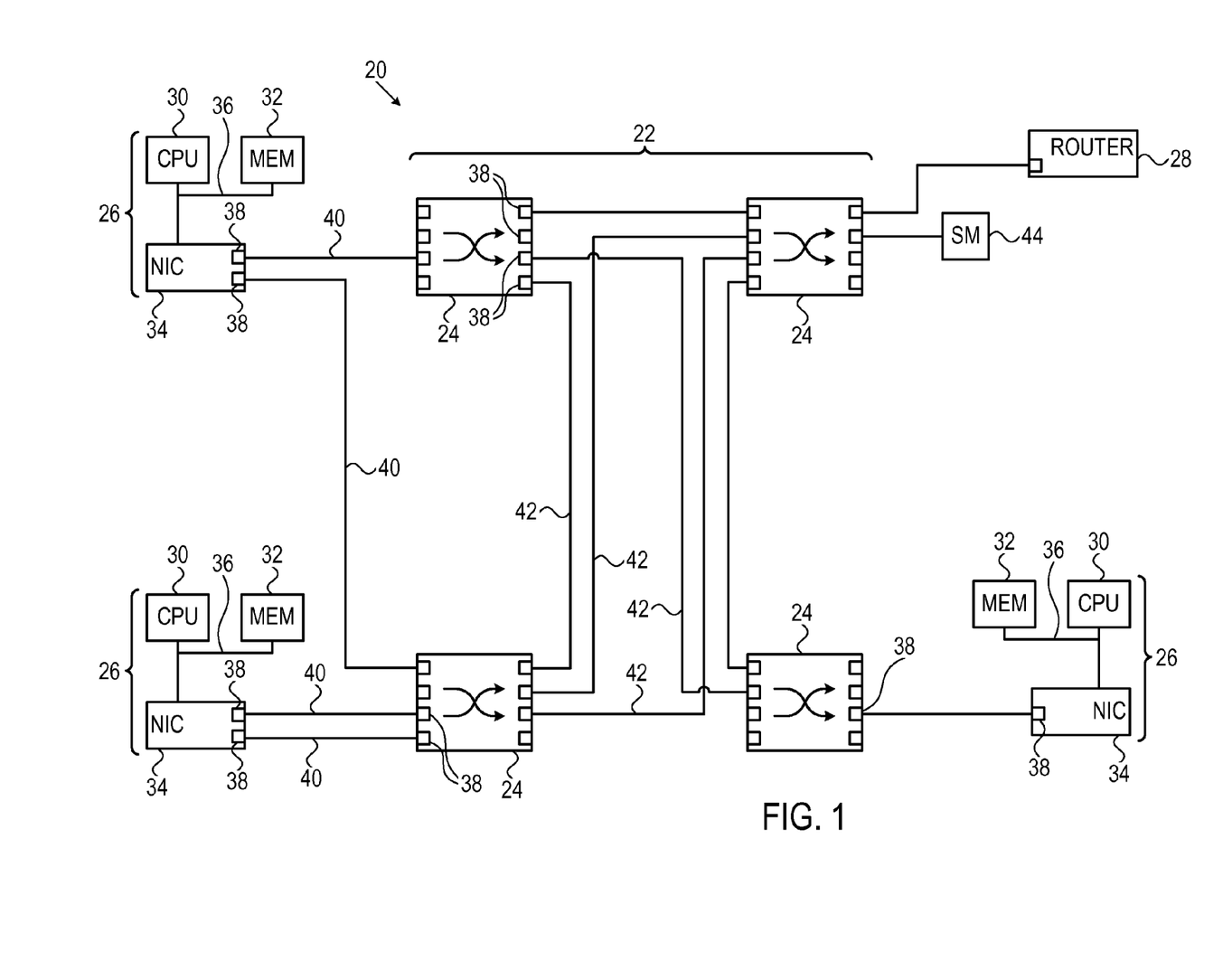
FIG. 1 is block diagram that schematically illustrates a computer network with virtualization support, in accordance with an embodiment of the present invention.

FIG. 1 is a block diagram that schematically illustrates a computer network 20, in accordance with an embodiment of the present invention. It will be assumed, for clarity and convenience of description, that network operates in accordance with IB specifications, although as noted earlier, the principles of the present embodiment may similarly be applied in other networks with similar features. The IB architecture is described in detail in the *InfiniBand™ Architecture Specification Volume* 1 (Release 1.2.1, November 2007), distributed by the InfiniBand Trade Association.

Network 20 comprises a switch fabric 22, comprising multiple interconnected switches 24, along with host computers (referred to simply as hosts 26) and possibly other network components, such as routers 28, storage devices, etc. Each host 26 typically comprises a central processing unit 30 and a memory 32, connected by a bus 36 to a network interface controller (NIC) 34, such as an IB host channel adapter (HCA). The elements of network that are shown in FIG. 1 constitute a subnet, which may be connected to other subnets by router 28. The different sorts of network elements that are shown in the figure are referred to collectively as "nodes" of the network.

Switches 24 and NICs 38 have respective network ports 38, which are interconnected by network data links 40 and 42. For the sake of clarity, access links 40 connect hosts 26 to switches 24, while core links 42 connect the switches one to the other, but these different types of links may be functionally and physically identical. In some cases, as shown in the figure, a pair of nodes may be connected by two or more parallel links 40 or 42 between respective ports 38 of the nodes. These parallel links may be joined to form an aggregated data channel by an overlay network, as described further hereinbelow. Although only two such parallel links are shown between pairs of nodes in FIG. 1, in practice three or more parallel links may be aggregated in this fashion.

A subnet manager (SM) 44 performs management functions defined by the above-mentioned IB specification, and possibly additional functions that support overlay topologies. SM 30 is typically a combined hardware/software element, comprising a computing platform, such as an embedded or stand-alone central processing unit (CPU) with a memory and suitable interfaces, which runs management software that performs certain functions described herein. The computing platform may be dedicated to subnet management functions, or it may alternatively be shared with other computing and communication functions. The software components of the SM may be downloaded to the computing platform in electronic form, for example over network 20 or via a separate control network (not shown). Alternatively or additionally, these software components may be stored on tangible, non-transitory computer-readable media, such as in optical, magnetic, or electronic memory.

SM 44 in each subnet assigns a Layer-2 address, in the form of a local identifier (LID), to each port 38 of each switch 24 and host 26 within the subnet, and possibly also a Layer-3 address (GID), as mandated by the IB specification. Each port thus receives a respective LID that is unique within the subnet to serve as an address for traffic within the subnet that is directed to the port, and may also receive a GID for use in addressing traffic between subnets. In addition to these LIDs (and GIDs), SM 44 assigns respective port identifiers to the ports, as an additional addressing layer not provided by the IB specification. Alternatively, hosts 26 themselves may assign such port identifiers. A given port identifier may be shared by multiple ports 38, typically ports on the same node, such as ports that connect via parallel, respective links 40 or 42 to corresponding ports on another node. Ports sharing the same port identifier may then be addressed collectively using this port identifier, particularly for purposes of supporting overlay network functions, such as LAG.

Figure 2:
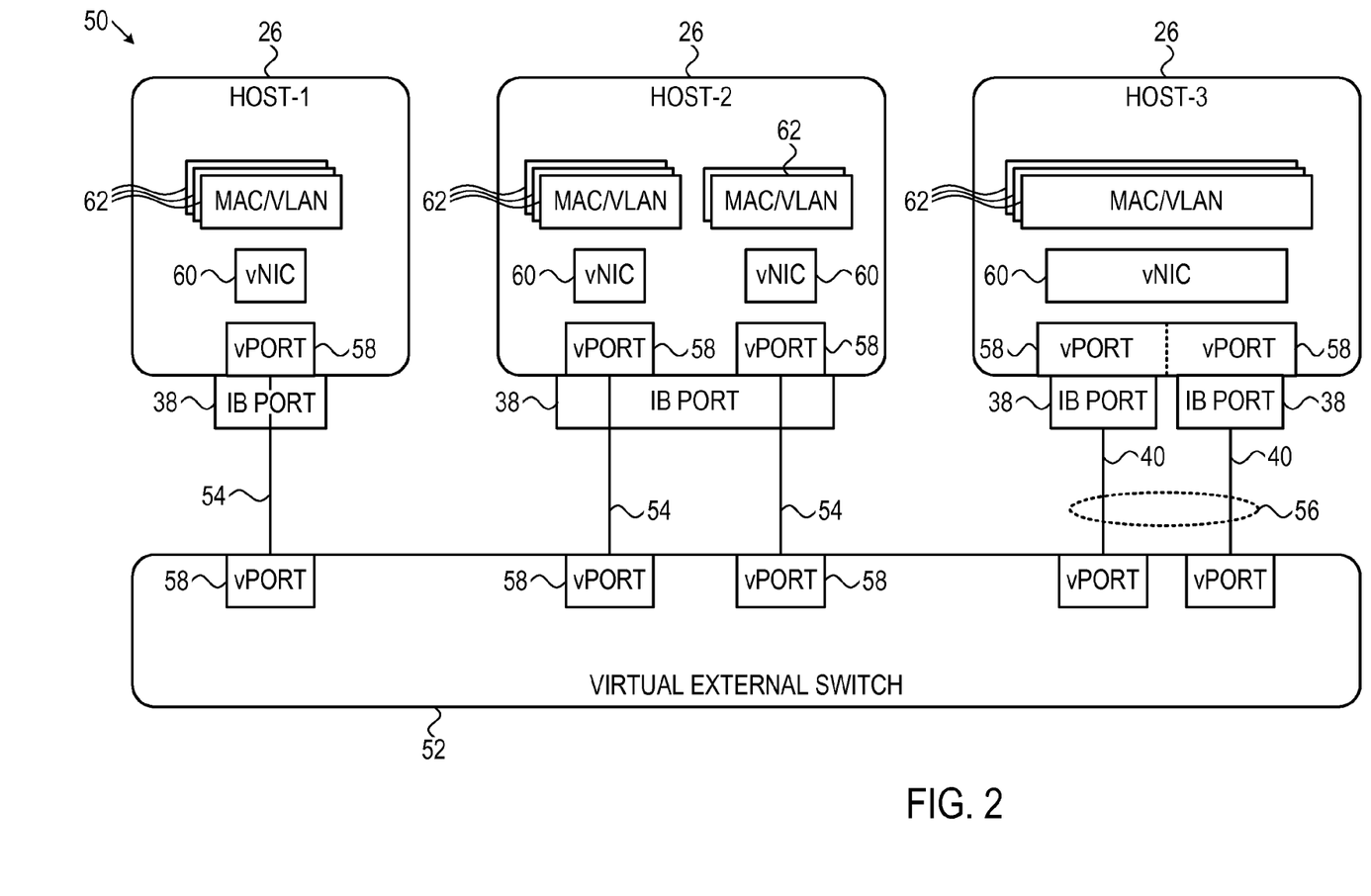
FIG. 2 is a block diagram that schematically illustrates functional components of a virtualized network, in accordance with an embodiment of the present invention.

FIG. 2 is a block diagram that schematically illustrates functional components of a virtualized tenant network 50, in accordance with an embodiment of the present invention. Whereas FIG. 1 shows primarily physical components of underlying network 20, assumed to be an IB network, FIG. 2 shows logical components of tenant network 50, which is assumed in this example to be an Ethernet network overlaid on network 20. Although this example, for the sake of clarity and simplicity, shows only a single tenant network, network 20 is capable of supporting multiple tenant networks of this sort concurrently. Each such tenant network is identified by a corresponding tenant network identifier (TNI), which is recognized and handled appropriately by NICs 34.

Switch fabric 22 appears to tenant network 50 as a single virtual external switch 52, through which overlay packets (such as Ethernet frames) are conveyed by encapsulation and tunneling through fabric 22. Each endpoint 62 on the tenant network (typically a virtual machine running on one of hosts 26) is identified by a tenant Layer-2 address, such as an Ethernet MAC address and virtual local area network (ULAN) identifier. NIC 34 presents itself to each of endpoints 62 as a "virtual NIC" (vNIC) 60, connecting the endpoint transparently to switch 52 via a "virtual port" (vPort) 58. These virtual ports connect via virtual network links 54, 56 to the virtual ports of switch 52.

Each virtual port 58 is identified by a corresponding port identifier, which is assigned to the underlying physical port 38, as explained above. In the case of Host-3 in FIG. 2, the same port identifier is shared by two physical ports, which connect via parallel physical links 40 to corresponding physical ports of one of switches 24. As a result, these links 40 can be joined into an aggregated data channel 56 between the corresponding vNIC 60 and virtual external switch 52. On the other hand, a single physical port 38 may support multiple virtual ports 58, as in Host-2. In this latter case, each of the virtual ports may be associated with (and keyed to) not only the LID, and possibly GID, of the physical port, but also an additional IB identifier, such as a queue pair number (QPN), so that each vPort in this case is keyed to the same LID but a different QPN.

Figure 3:
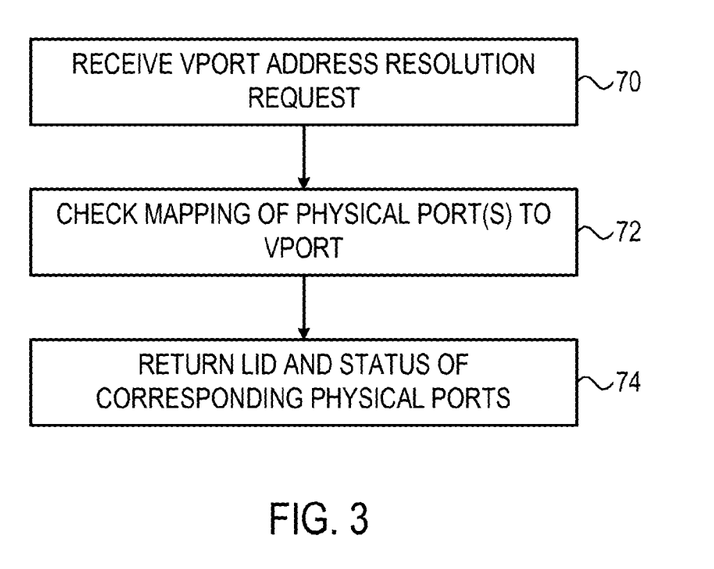
FIG. 3 is a flow chart that schematically illustrates a method for address resolution, in accordance with an embodiment of the present invention.

FIG. 3 is a flow chart that schematically illustrates a method for address resolution, in accordance with an embodiment of the present invention. The method may be used, for example, in network 20 to resolve addresses used in carrying tunneled traffic for tenant network 50. Such traffic might be directed, for instance, between tenant network endpoints 62 on Host-1 and Host-3 in FIG. 2 via aggregated data channel 56.

In order to determine the path over which the traffic should actually be forwarded through network 20, the MAC/ULAN address of each endpoint 62 in tenant (overlay) network 50 is mapped to the corresponding physical port (or ports) 38. For this purpose, the nodes in network 20 exchange address resolution requests, at a request submission step 70. These requests ask the peer nodes to specify the port identifier of the vPort 58 corresponding to each MAC/VLAN in the tenant network, as well as to provide the LID and QPN (or multiple LIDs and QPNs) of the port (or ports) 38 covered by this port identifier.

In response to such a query, the receiving node checks the mapping of the LIDs of its own physical ports to the corresponding port identifiers, at a port mapping step 72. At the same time, the receiving port may check the status of these physical ports to determine, for example, whether all ports 38 and corresponding links 40, 42 are fully operational, or whether one or more of the ports are down or disconnected. The node receiving the query then returns an address resolution response indicating the LIDs and QPNs of the corresponding physical ports and their status, at a response step 74.

When multiple physical links are aggregated, as in aggregated data channel 56, the responding node may return both the LIDs of all of the physical links in the group and the respective status of each physical link.

Thus, when an address resolution request relates to a data path traversing an aggregated data channel, the response will include both port identification and port status. The node receiving this information will then be able to direct packets having a given MAC/VLAN destination address in tenant network 50 to the appropriate, operational physical links in underlying network 20. This extension of conventional address resolution protocols—which ordinarily provide only address information, but not status—is particularly useful in the context of virtualized networks overlaid on an IB infrastructure, but may similarly be used in other applications of link aggregation.

When the status of one of physical links 40, 42 and/or the corresponding ports 38 changes during network operations, the node on which the port in question is located may report the change to the other nodes in the subnet by flooding an unsolicited address resolution response through the subnet. Such flooding is similar to the means that are provided by conventional address resolution protocols for announcing changes in address information.

Figures 4, 5:
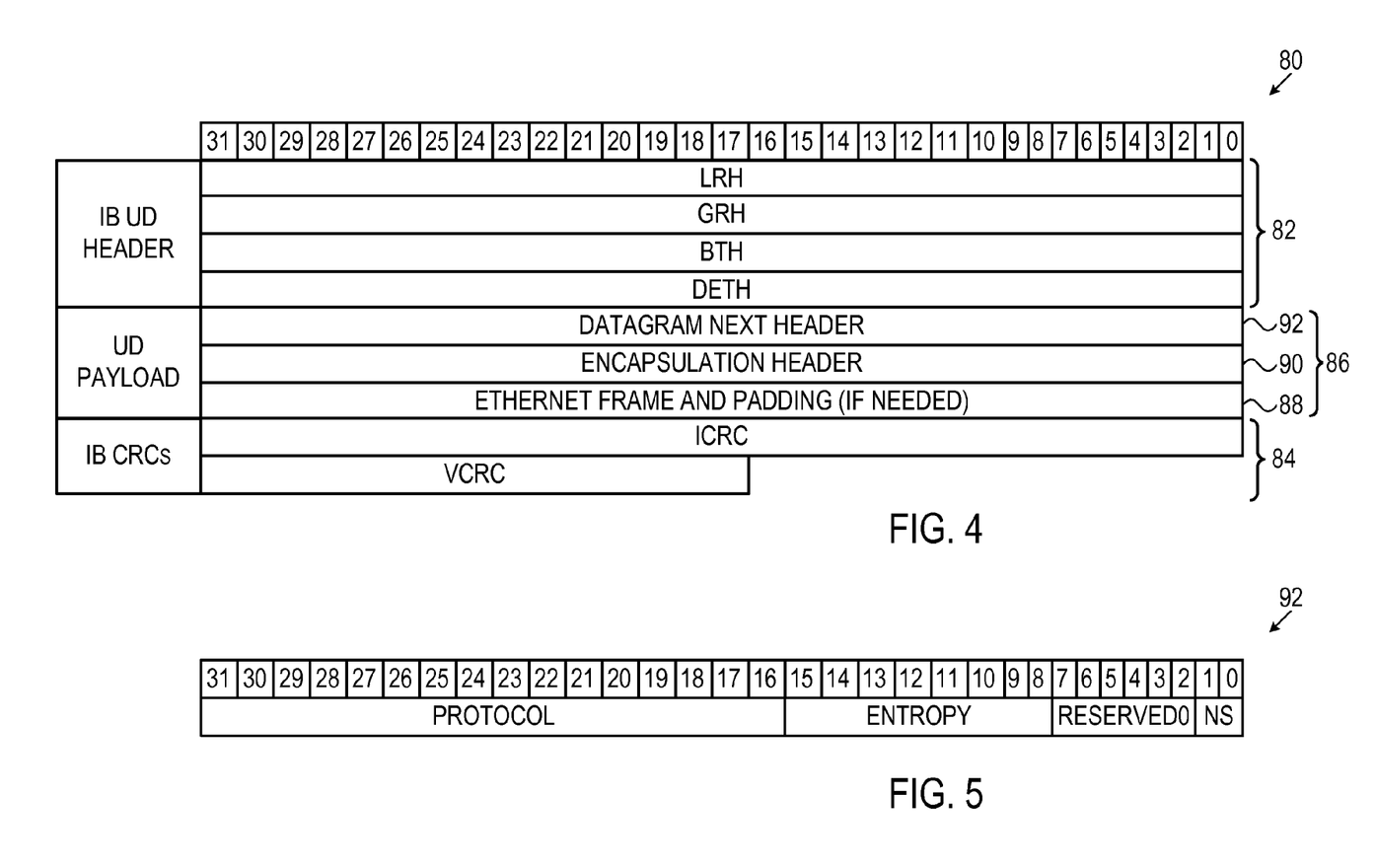
FIGS. 4-6 are block diagrams that schematically illustrate components of a data packet transmitted over a virtualized network, in accordance with an embodiment of the present invention.
Figure 6:
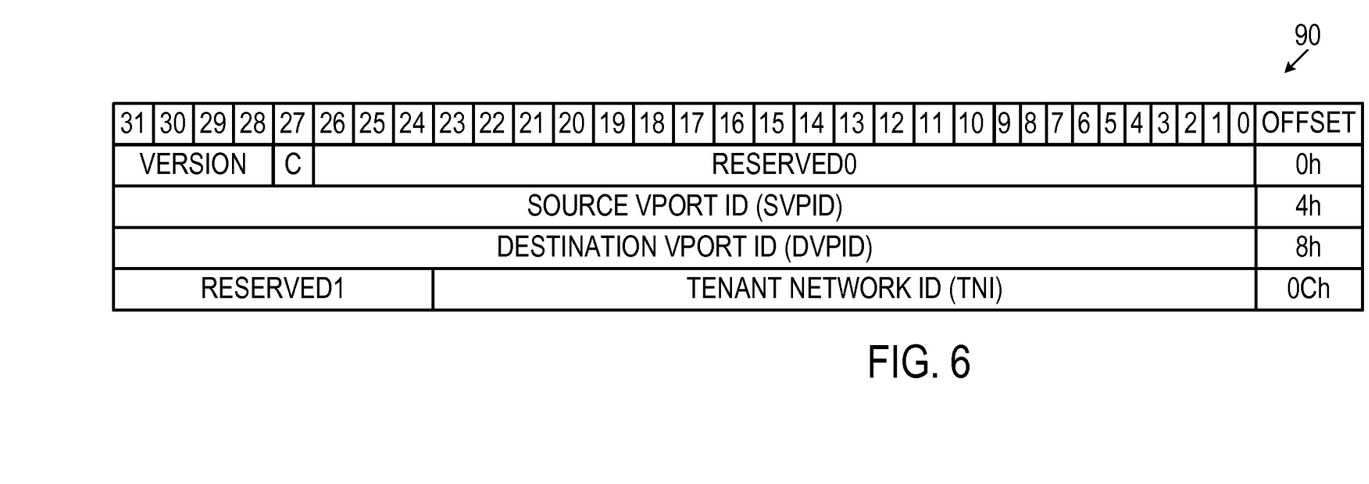

FIGS. 4-6 are block diagrams that schematically illustrate components of a data packet 80 transmitted over a virtualized network, in accordance with an embodiment of the present invention. In this example, it will be assumed that packet 80 is transmitted on Ethernet tenant network 50, supported by underlying IB physical network 20. The format of packet 80, however, is suitable for supporting a variety of different tenant network protocols over the same IB infrastructure, and using the same hardware and software routines in the infrastructure to parse multiple different tenant protocols and packet formats.

Packet 80 comprises an outer header 82, with a format that includes data link (LRH), network (GRH), and transport layer headers (BTH and DETH), in accordance with IB convention, as set forth in the above-mentioned IB specification. The packet ends with error checking fields 82 (ICRC and VCRC), which are also in accordance with the IB specification. Packet 80 thus has the external form required of any IB packet, and typically conforms to the unreliable datagram (UD) transport service type, which is generally best suited for encapsulating IP and Ethernet traffic.

Packet 80 comprises a payload 86 which contains an Ethernet frame 88, preceded by intermediate headers 90 and 92. Frame 88 includes its own header (not shown), referred to as the inner packet header, which conforms to the Ethernet protocol and any applicable higher-level protocols, such as Layer-3 and higher-layer protocols of the IP suite. This part of payload 86 is padded (typically with dummy characters) if needed to conform to the IB specification. Alternatively, payload 86 may contain other sorts of encapsulated packets, such as Fibre Channel frames, with inner headers conforming to the appropriate tenant network protocols.

The intermediate headers in packet 80 comprise an encapsulation header 90, preceded by a protocol identification header 92. Encapsulation header 90, as shown in FIG. 6, contains the tenant network identifier (TNI) of tenant network 50 and also contains the source and destination port identifiers of vPorts 58 on the source and destination hosts 26 between which packet 80 is transmitted. Header 90 is particularly suited for encapsulating Ethernet frames, although this format or another, similar format may also be used in encapsulating other Layer-2 protocols. The Version field in header 90 may be used to indicate the encapsulation protocol version, while the "C" flag is used to mark control packets that may not be Ethernet-compliant.

Protocol identification header 92, as shown in FIG. 5, indicates the protocol type of encapsulation header 90 and of the inner header of the encapsulated packet that follows. The format of header 92 is uniform over all of the tenant network communication protocols that are supported by underlying network 20. The Protocol field in header 92 contains a two-byte code identifying the encapsulated protocol, to enable convenient parsing by underlying hardware or software, while the NS field identifies the namespace of the Protocol code. Header 92 may optionally contain an Entropy field, indicating the flow entropy of the packet. Entropy is a network metric that indicates changes in data stream flows in a network, as described, for example, in U.S. Pat. No. 7,773,538, which is incorporated herein by reference. The entropy measure provided by header 92 can be useful in controlling load balancing among switches 24, for example.

Although outer header 82 in packet 80 conforms specifically to IB protocol requirements, a similar sort of packet format, making use of protocol identification header 92, may be advantageously used over other sorts of underlying networks, subject to appropriate choice of the fields of outer header 82. More generally, as noted above, although the preceding embodiments are directed in particular to virtualization and encapsulation of Ethernet frames over an IB infrastructure, the principles of the present invention may similarly be applied to encapsulation of other overlay network protocols, over either an IB infrastructure or underlying networks of other types.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for communication, comprising:
in a packet data network comprising a subnet containing multiple nodes having respective ports, assigning respective local identifiers to the ports in the subnet, such that each port receives a respective local identifier that is unique within the subnet to serve as an address for traffic within the subnet that is directed to the port;
assigning, in addition to the local identifiers, respective port identifiers to the ports, such that at least one of the port identifiers is shared by a plurality of the ports, but not by all the ports, in the subnet;
addressing a packet to the plurality of the ports collectively using the at least one of the port identifiers;
resolving the at least one of the port identifiers to address the packet to a respective local identifier, responsive to operational status information of the ports; and
forwarding the packet to the port identified by the local identifier,
wherein the subnet operates in accordance with a first network protocol and supports an overlay network operating in accordance with a second network protocol, and wherein addressing a packet to the plurality of the ports comprises transmitting over the subnet a data packet that has an outer header in accordance with the first network protocol and encapsulates a data frame having an inner header in accordance with the second network protocol, wherein transmitting the data packet comprises specifying the local identifier of a destination port of the data packet in the outer header, specifying a port identifier of the destination port in an encapsulation header in the data packet, and specifying an overlay network address of a destination endpoint of the overlay network in the inner header.

2. The method according to claim 1, wherein addressing a packet to the plurality of the ports comprises aggregating multiple data links in the subnet that are respectively connected to the ports in the plurality to provide an aggregated data channel.

3. The method according to claim 1, wherein addressing a packet to the plurality of the ports comprises receiving an address resolution request with respect to an address in the overlay network, and returning a response to the request that associates the address with the at least one of the port identifiers and indicates a status of each of one or more of the ports in the plurality.

4. The method according to claim 1, wherein transmitting the data packet comprises inserting an intermediate header between the outer and inner packet headers, wherein the intermediate header specifies the second network protocol of the inner header and has a format that is uniform over a plurality of overlay network protocols that are supported by the underlying network.

5. The method according to claim 1, wherein resolving the at least one of the port identifiers to address the packet to a respective local identifier is performed by an entity transmitting the packet.

6. The method according to claim 1, wherein assigning respective port identifiers to the ports comprises assigning at least one of the port identifiers to a plurality of ports of a first node connected by parallel links to a second node.

7. A method for communication, comprising:
aggregating multiple data links between multiple first ports of a first node and multiple second ports of a second node in a network to provide an aggregated data channel;
receiving an address resolution request relating to a data path traversing the aggregated data channel;
returning a response to the address resolution request that identifies the multiple first ports and indicates an operational status of each of one or more of the first ports; and
transmitting data packets over the data path while directing the transmitted data packets to respective ports among the multiple first ports responsively to the operational status,
wherein the network operates in accordance with a first network protocol and supports an overlay network operating in accordance with a second network protocol, and wherein transmitting the data packets comprises sending, based on the response, a data packet that has an outer header in accordance with the first network protocol, including a local identifier of one of the first ports chosen responsively to the status, and which encapsulates a data frame having an inner header in accordance with the second network protocol.

8. Communication apparatus, comprising:
a first node configured for deployment in a subnet containing multiple nodes of a packet data network, the node comprising multiple ports for connection to the network and being configured to receive a first assignment of respective local identifiers to the ports, such that each port receives a respective local identifier that is unique within the subnet to serve as an address for traffic within the subnet that is directed to the port,
wherein the first node is configured to receive, in addition to the local identifiers, a second assignment of respective port identifiers to the ports, such that at least one of the port identifiers is shared by a plurality of the ports of the node, but not by all the ports, in the subnet, and the plurality of the ports are addressed collectively using the at least one of the port identifiers, and
a second node configured to address data packets to the plurality of the ports of the first node collectively using the at least one of the port identifiers, to resolve the at least one of the port identifiers to address the data packets to respective local identifiers, responsive to operational status information of the ports and to forward the packets to the ports identified by the local identifiers of the data packets,
wherein the subnet operates in accordance with a first network protocol and supports an overlay network operating in accordance with a second network protocol, and wherein the second node is configured to transmit over the subnet a data packet that has an outer header in accordance with the first network protocol and encapsulates a data frame having an inner header in accordance with the second network protocol, wherein the local identifier of a destination port of the data packet is specified in the outer header, a port identifier of the destination port is specified in an encapsulation header in the data packet, and an overlay network address of a destination endpoint of the overlay network is specified in the inner header.

9. The apparatus according to claim 8, wherein the first node is configured to aggregate multiple data links in the subnet that are respectively connected to the ports in the plurality to provide an aggregated data channel.

10. The apparatus according to claim 8, wherein the first node is configured to receive an address resolution request with respect to an address in the overlay network, and to return a response to the request that associates the address with the at least one of the port identifiers and indicates a status of each of one or more of the ports in the plurality.

11. The apparatus according to claim 8, wherein the second node is configured to insert an intermediate header between the outer and inner packet headers, wherein the intermediate header specifies the second network protocol of the inner header and has a format that is uniform over a plurality of overlay network protocols that are supported by the underlying network.

12. The apparatus according to claim 8, wherein the first node comprises a host computer, which comprises a network interface controller comprising the multiple ports.

13. The apparatus according to claim 8, wherein the second node comprises a switch.

14. Apparatus for communication, comprising:
a first node and a second node configured for deployment in a packet data network containing multiple nodes, the first node comprising multiple first ports for connection to respective data links in the network and being configured for aggregation of the data links between the multiple first ports and multiple second ports of the second node to provide an aggregated data channel,
wherein at least the first node is configured to receive an address resolution request relating to a data path traversing the aggregated data channel and to return a response to the address resolution request that identifies the multiple first ports and indicates an operational status of each of one or more of the first ports,
wherein the multiple nodes are configured to transmit data packets over the data path while directing the transmitted data packets to respective ports among the multiple first ports responsively to the status, wherein the network operates in accordance with a first network protocol and supports an overlay network operating in accordance with a second network protocol, and wherein the multiple nodes are configured to transmit, based on the response returned by the first node, a data packet that has an outer header in accordance with the first network protocol, including a local identifier of one of the first ports chosen responsively to the status, and which encapsulates a data frame having an inner header in accordance with the second network protocol.

\* \* \* \* \*